(12) United States Patent
Chen et al.

(10) Patent No.: US 7,264,320 B2
(45) Date of Patent: Sep. 4, 2007

(54) COMPUTER ENCLOSURE WITH LOCKING MEMBER FOR ASSEMBLING DRIVE BRACKET

(75) Inventors: Yun-Lung Chen, Tu-Cheng (TW); Xing-Yuan Li, Shenzhen (CN)

(73) Assignees: Hong Fu Jin Precision Industry (Shenzhen) Co., Ltd., Guangdong Province (CN); Hon Hai Precision Industry Co., Ltd., Taipei Hsien (TW)

( * ) Notice: Subject to any disclaimer, the term of this patent is extended or adjusted under 35 U.S.C. 154(b) by 415 days.

(21) Appl. No.: 10/953,684

(22) Filed: Sep. 29, 2004

(65) Prior Publication Data

US 2005/0200248 A1 Sep. 15, 2005

(30) Foreign Application Priority Data

Mar. 12, 2004 (TW) .............................. 93203793 U

(51) Int. Cl.
*A47B 97/00* (2006.01)
(52) U.S. Cl. .................................................. 312/223.2
(58) Field of Classification Search ............. 312/223.1, 312/223.2, 319.1; 361/683, 684, 685, 724, 361/725, 726, 727; 248/346.01, 581
See application file for complete search history.

(56) References Cited

U.S. PATENT DOCUMENTS 5,224,024 A * 6/1993 Tu et al. ..................... 361/831
5,768,099 A * 6/1998 Radloff et al. .............. 361/685
6,052,277 A * 4/2000 Liu et al. .................... 361/685
6,147,862 A * 11/2000 Ho .............................. 361/685
6,222,725 B1 * 4/2001 Jo .............................. 361/683

FOREIGN PATENT DOCUMENTS

TW          537425         6/2003

* cited by examiner

*Primary Examiner*—James O. Hansen
(74) *Attorney, Agent, or Firm*—Morris Manning & Martin LLP; Tim Tingkang Xia, Esq.

(57) ABSTRACT

A computer enclosure comprises a base (10), a drive bracket (300) received in the base and a locking member (100). A stopping portion (372) extends downwardly from a bottom plate (370) of the drive bracket. The locking member comprises a supporting base (110) secured on the base and an operating part (160) pivotally supported by the supporting base. The operating part comprises a hook portion (178), a driving portion (176) and a pressing portion (180). The drive bracket is engaged in the base when the stopping portion is sandwiched by the hook portion and the driving portion. The drive bracket is disengaged when the pressing portion is pressed to drive the hook portion away from the stopping portion and the driving portion pushes the stopping portion.

20 Claims, 5 Drawing Sheets

COMPUTER ENCLOSURE WITH LOCKING MEMBER FOR ASSEMBLING DRIVE BRACKET

BACKGROUND OF THE INVENTION

1. Field of the Invention

The present invention relates to a computer enclosure, and more particularly to a computer enclosure having a locking member which readily assembles and disassembles a drive bracket therefrom, together with a pre-disassembly function.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional drive bracket is generally attached to a computer enclosure by bolts or rails. Fixing the drive bracket to the computer enclosure with bolts is unduly laborious and time-consuming. Furthermore, the computer enclosure needs extra operating space for carrying out the fixing operation. Since components of a computer are compactly arranged in a computer enclosure, the assembly and disassembly thereof is complicated and low efficient. Moreover, the components may be destroyed by inadvertent operation. Fixing a drive bracket in a computer base using rails is more convenient than using the above-described bolts. However, the rails are generally made of plastic. This leads to extra maintenance because of the plastic rails easily wearing out and resultantly needing replacement.

Another computer enclosure with drive bracket assembly is disclosed in Taiwan patent application No. 091212339. The drive bracket assembly comprises a drive bracket, an assembly panel, and a positioning device. A clip plate, which can move in lateral directions, is formed on a side plate of the drive bracket. The clip plate has elastic restoring force. A bevel guiding edge and a clip slot are formed at a front edge of the clip plate. A clip member is formed on the assembly panel corresponding to the clip slot. The assembly panel can be a surface of a computer base or an inner surface of a computer enclosure. The positioning device comprises at least a guiding groove and a corresponding positioning member. The guiding groove and the positioning member are formed on a proper position between the drive bracket and the assembly panel. The positioning member is engaged in the clip slot of the clip plate to secure the bracket on the assembly panel. The clip plate is moved away to make the positioning member disengage from the clip slot, thus the bracket is disassembled from the assembly panel. However, the assembly and disassembly of the drive bracket still need to be operated in inner space of a computer enclosure.

Thus an improved computer enclosure which overcomes the above-mentioned problems is desired.

SUMMARY OF THE INVENTION

Accordingly, an object of the present invention is to provide a computer enclosure with a locking member, the locking member readily and conveniently secures a drive bracket in the computer enclosure and allows ready detachment therefrom.

To achieve the above-mentioned object, a computer enclosure comprises a base, a drive bracket and a locking member. The base comprises a bottom panel, a side panel, a first positioning wall secured on the bottom panel, and a second positioning wall parallel to the side panel. An entrance opening is defined in the front panel. The drive bracket is received in the base through the entrance opening. The drive bracket comprises a bottom plate and a pair of side plates bent perpendicularly upwardly from opposite sides of the bottom plate. A bending piece is formed outwardly from front end of the drive bracket to abut against an outside of the front panel. A stopping portion extends downwardly from the bottom plate. The locking member comprises a supporting base secured on the base and an operating part pivotally supported by the supporting base. A resilient part is used to connect the supporting base and the operating part. A hook portion and a driving portion are formed on a top portion of the operating part. A pressing portion is formed on a bottom portion of the operating part. The drive bracket is engaged in the base when the stopping portion is sandwiched by the hook portion and the driving portion. The drive bracket is disengaged when the pressing portion is pressed to drive the hook portion away from the stopping portion and the driving portion pushes the stopping portion.

Other objects, advantages and novel features of the present invention will be drawn from the following detailed description of a preferred embodiment of the present invention with attached drawings, in which:

DETAILED DESCRIPTION OF THE INVENTION

Figure 1:
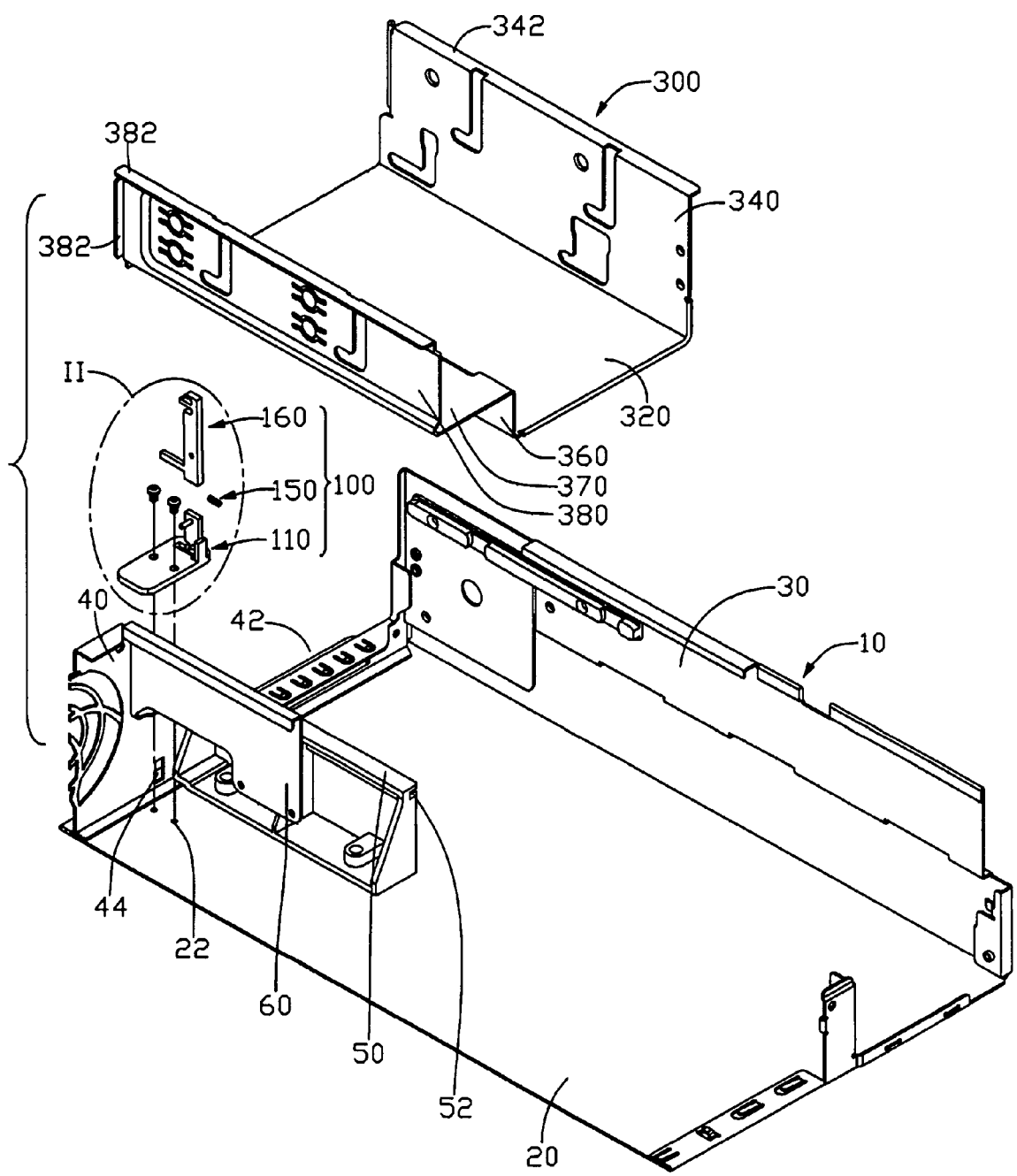
FIG. 1 is an exploded, isometric view of a computer enclosure in accordance with the preferred embodiment of present invention, the computer enclosure comprising a base, a locking member and a drive bracket.
Figure 2:
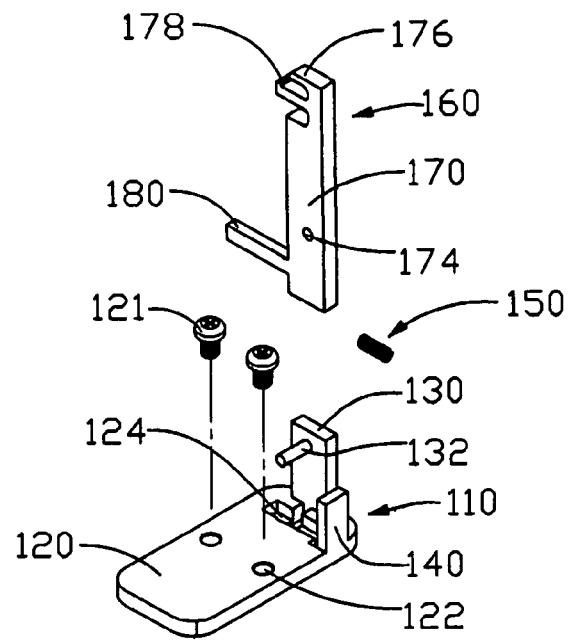
FIG. 2 is an enlarged view taken from II of FIG. 1.
Figure 3:
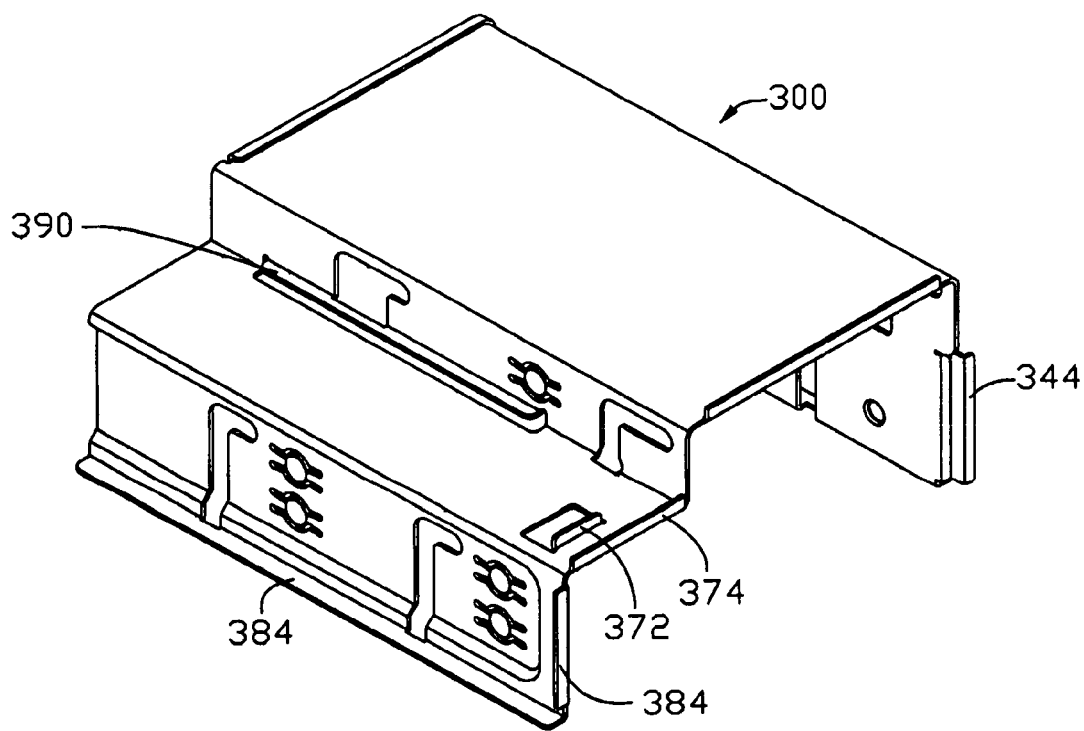
FIG. 3 is an isometric view of the drive bracket of FIG. 1 from another aspect.

Referring to FIGS. 1 to 3, a computer enclosure in accordance with the preferred embodiment of the present invention comprises a base 10, a locking member 100, and a drive bracket 300. The drive bracket 300 is used to receive data storage devices (not shown) such as hard disk drives and floppy disk drives.

The base 10 comprises a bottom panel 20, a side panel 30, a front panel 40, a first positioning panel 50 secured on the bottom panel 20, and a cantilevered second positioning panel 60 extending from the front panel 40 parallel to the side panel 30. Two screw holes 22 are defined in the bottom panel 20. The side panel 30 and the front panel 40 are bent perpendicularly from the bottom panel 20 in a same direction, respectively. An entrance opening 42 is defined in the front panel 40 for receiving the drive bracket 30. The first positioning panel 50, which is also parallel to the side panel 30, is located proximally to the second positioning panel 60 between the side panel 30 and the second positioning panel 60. A hole 44 is defined in a lower portion of the front panel 40 between the first positioning panel 50 and the second positioning panel 60. A long positioning groove 52 is defined along a top inner side of the first positioning panel 50.

The locking member 100 comprises a supporting base 110, a resilient part 150 and an operating part 160 supported by the supporting base 110.

The resilient part 150 can be a spring or other similar member that has a resilient restoring force. The supporting base 110 is secured on the bottom panel 20 abutting the front panel 40, with a side face parallel to the front panel 40. The supporting base 110 comprises a baseboard 120, a first supporting wall 130 and a second supporting wall 140. The first supporting wall 130 and the second supporting wall 140 are bent upwardly from the baseboard 120 from adjoining sides thereof. Two locking holes 122 are defined in the baseboard 120 corresponding to the screw holes 22 of the bottom panel 20, for receiving corresponding number of screws 121 for coupling the baseboard 120 to the bottom panel 20. A slot 124 is defined in the baseboard 120 between the first and second supporting wall 130, 140. A pivot shaft 132 is extended perpendicularly from the first supporting wall 130 and located just above the slot 124. A protrusion (not shown) is formed on the second positioning wall 140 for holding the resilient part 150 thereon.

The operating part 160 is integrally formed, and comprises a main body 170 and a pressing portion 180 extending outwardly from a side surface of the main body 170. A through hole 174 is defined in the main body 170 above the pressing portion 180 for receiving the pivot shaft 132 of the supporting base 110. A top portion of the main body 170 is generally F-shaped, comprising a driving portion 176 on a top end thereof and a hook portion 178 just beneath the driving portion 176. The driving portion 176 and the hook portion 178 are extended parallel to the pressing portion 180 in same direction respectively.

The drive bracket 300 comprises a first bottom plate 320, a first side plate 340 bent perpendicularly upwardly from a side of the first bottom plate 320, a second bottom plate 370 parallel to the first bottom plate 320, a connecting plate 360 connecting between the first bottom plate 320 and the second bottom plate 370, and a second side plate 380 bent perpendicularly upwardly from a free edge of the second bottom plate 370. A stopping portion 372 is extended downwardly from the second bottom 370 corresponding to the hook portion 178 of the locking member 100. A positioning piece 390 is extended outwardly from a top edge of the connecting plate 360 and is parallel to the second bottom plate 370. A plurality of bending pieces 344, 374, 384 is formed outwardly on top and front edges of the drive bracket 300 respectively, for cooperating with the base 10 for supporting the bracket 300. Persons skilled in the art will understand that the first bottom plate 320 and the second bottom plate 370 may be replaced with one plate, thus the connecting plate 360 is omitted.

Figure 4:
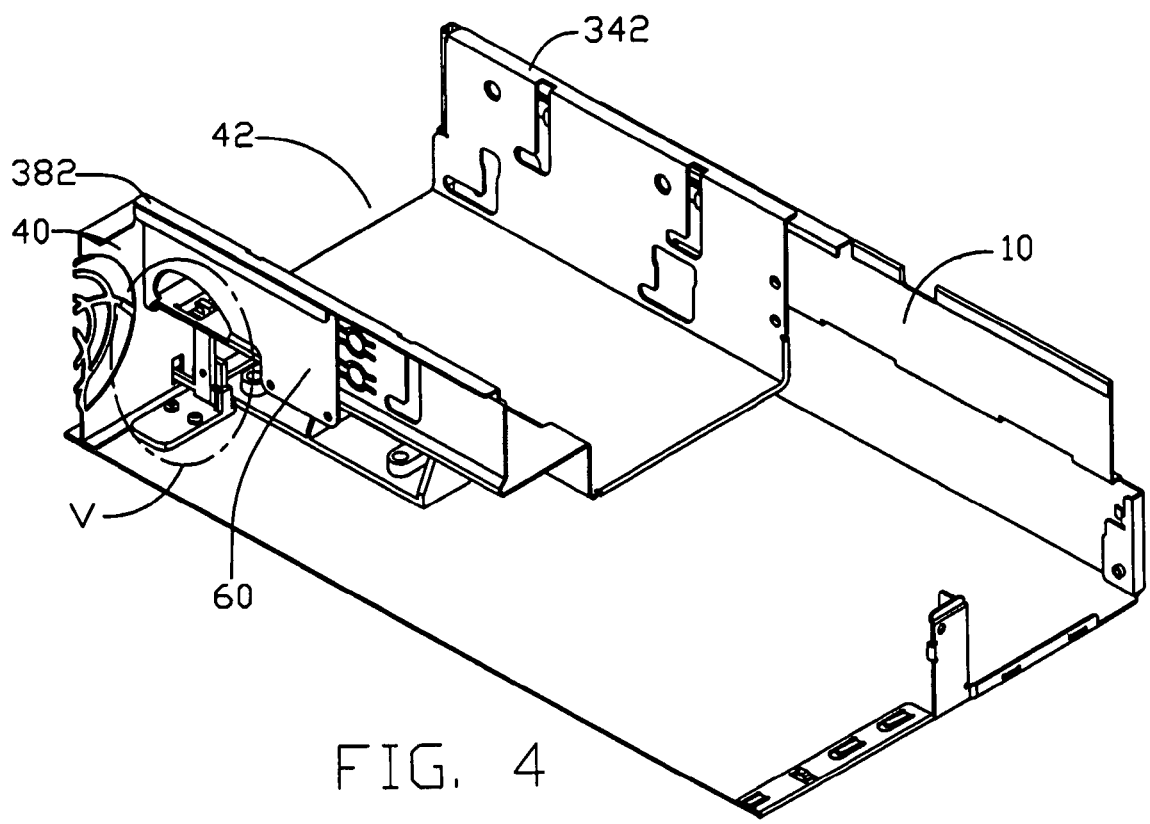
FIG. 4 is an assembled view of FIG. 1, showing the locking member in a locked position.
Figure 5:
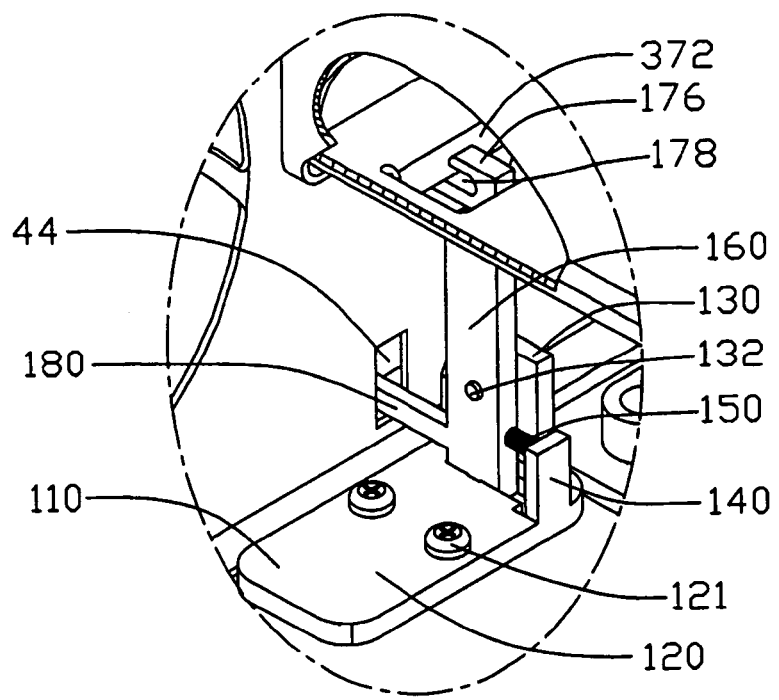
FIG. 5 is an enlarged view taken from V of FIG. 4.
Figure 6:
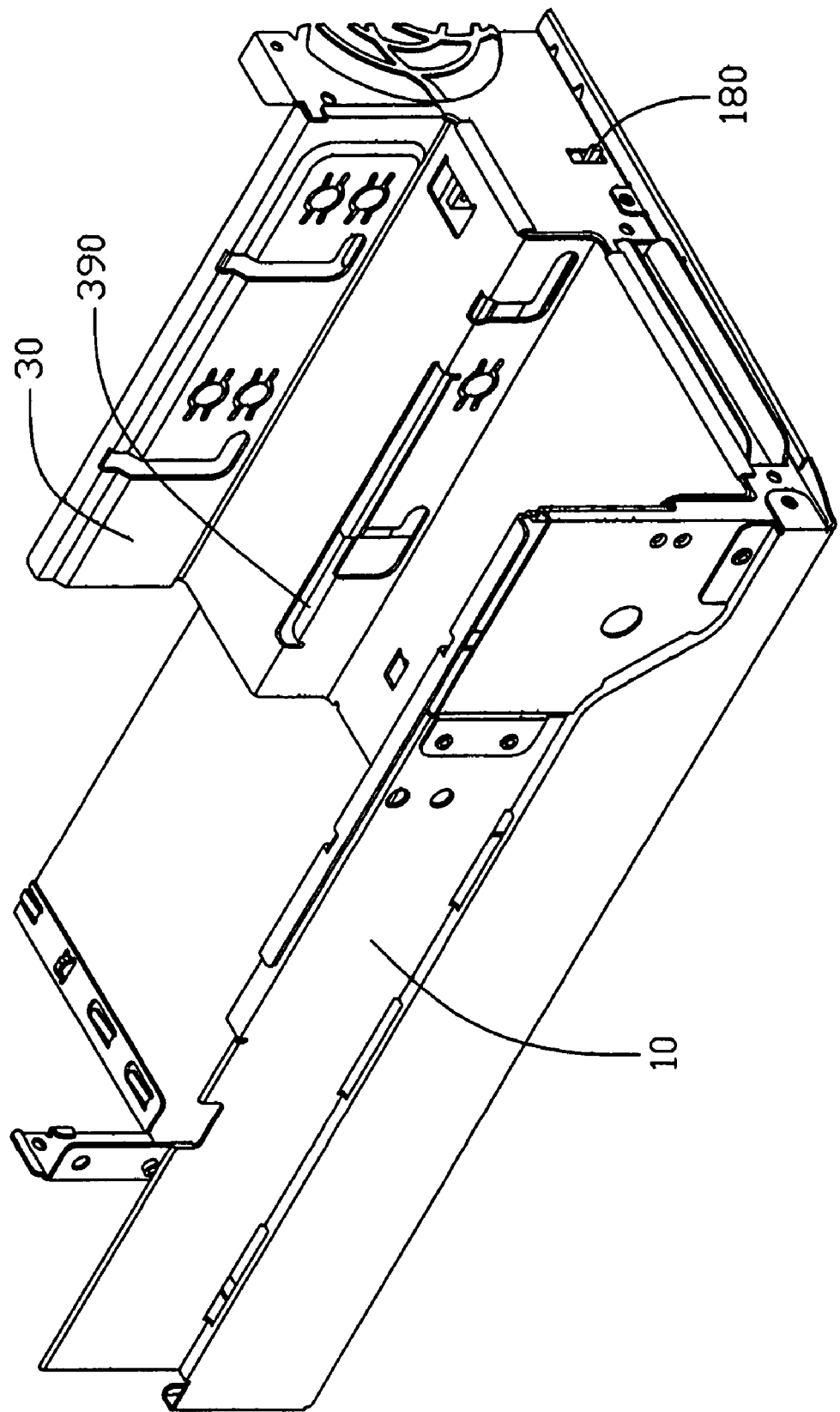
FIG. 6 is similar to FIG. 4, but showing from another aspect.

Referring also to FIGS. 4 to 6, in assembly, the locking member 100 is firstly secured on the base 10, and then the drive bracket 300 is put into the base 10, the steps would be described in details below.

The supporting base 110 together with the resilient part 150 secured thereon is put on the bottom panel 20, and the two screws 122 are manipulated to fasten the supporting base 110 to the bottom panel 20. Then a bottom end of the operating part 160 is inserted into the slot 124, while the pressing portion 180 is extended through the hole 44 of the front panel 40. The pivot shaft 132 of the supporting base 110 is extended through the through hole 174 of the operating part 160. At the time, the bottom end of the operating part 160 does not touch the bottom panel 20, but is pressed against a front end of the slot 124 by a force exerted by the resilient part 150.

The drive bracket 300 is then pushed towards an inside of the base 10 through the entrance opening 42. The positioning piece 390 of the drive bracket 300 slides into the positioning groove 52. The bending pieces 344, 374, 384 of the drive bracket 300 abut against the top portions and front portions of the base 10 respectively. The hook portion 178 of the operating part 160 is gradually pressed by the stopping portion 372, and finally clasps a front surface of the stopping portion 372 when the stopping portion 372 gets over the hook portion 160. At the time, the driving portion 176 is located behind the stopping portion 372. Thus the drive bracket 300 is prevented from moving forward and backward.

Figure 7:
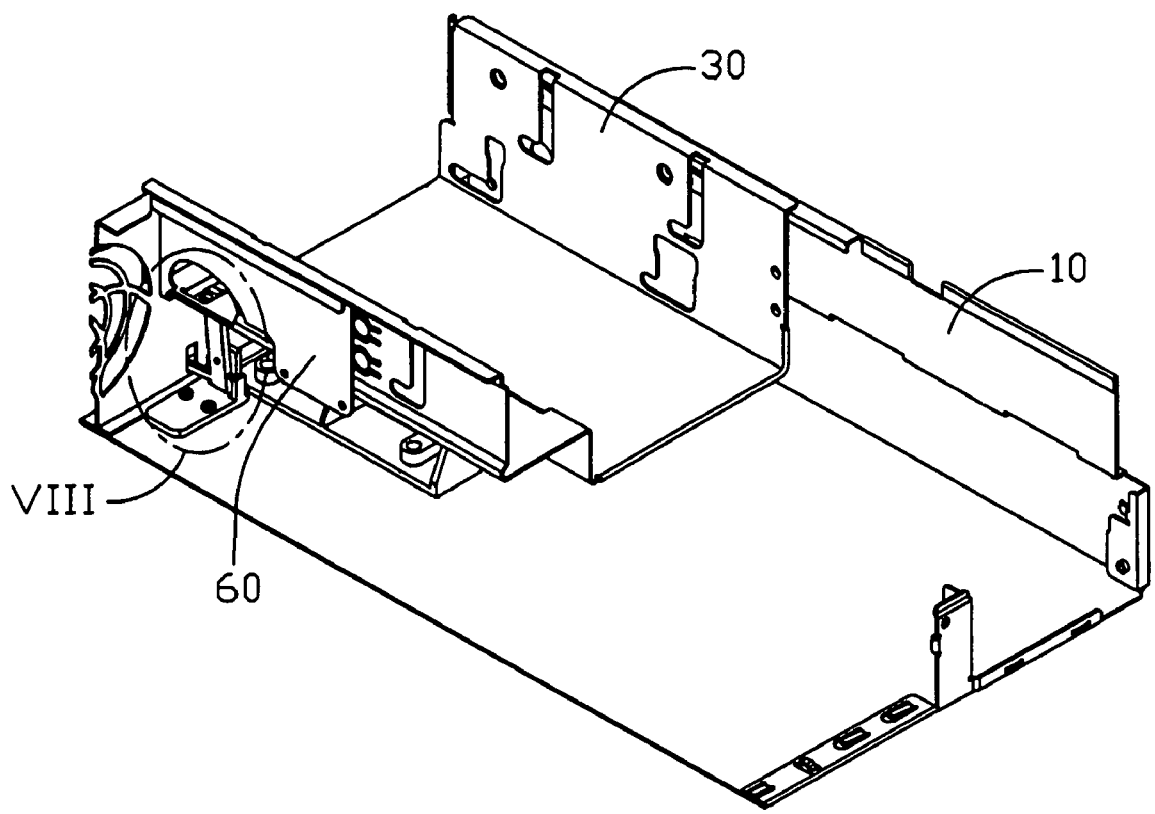
FIG. 7 is an assembled view of FIG. 1, showing the locking member in an unlocked position.
Figure 8:
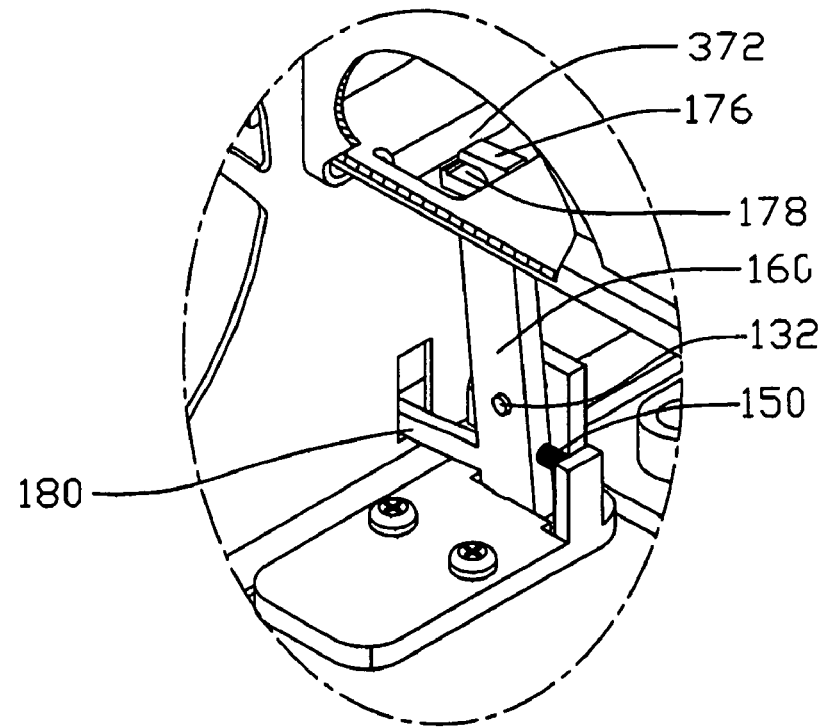
FIG. 8 is an enlarged view taken from VIII of FIG. 7.

Referring also to FIGS. 7 and 8, in disassembly, the pressing portion 180 of the locking member 100, which is shown out of the front panel 40, is depressed, the hook portion 178 is rotated forward relative to the front panel 60, so that the hook portion 178 is disengaged from the stopping portion 372 of the drive bracket 300, and the driving portion 176 pushes the stopping portion 372. The resilient part 150 is compressed. The drive bracket 300 is pushed slightly out from the base 10 by the deriving portion 176. After that, the pressing portion 180 is released, and the operating part 160 is urged to original position by the resilient part 150. Thus, the drive bracket 300 is readily taken out from the base 10.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A computer enclosure comprising:
   a base comprising a positioning wall and a front panel, an entrance opening defined in the front panel;
   a drive bracket received in the base, the drive bracket comprising a bottom plate, a stopping portion extended downwardly from the bottom plate; and
   a locking member comprising a supporting base secured on the base and an operating part pivotally supported by the supporting base, a resilient part connected between the supporting base and the operating part, the operating part comprising a pressing portion, a hook portion and a driving portion;
   wherein the hook portion and the driving portion sandwich the stopping portion therebetween to fix the drive bracket in the base, and the pressing portion is pressed to disengage the hook portion from the stopping portion while the driving portion constantly contacts the stopping portion to detach the drive bracket from the base.

2. The computer enclosure as described in claim 1, wherein the supporting base comprises a baseboard, and a first supporting wall and a second supporting wall bent upwardly from adjacent sides of the baseboard, the resilient part is secured on an inner surface of the second supporting wall.

3. The computer enclosure as described in claim 2, wherein a slot is defined in the baseboard between the first supporting wall and the second supporting wall for receiving a bottom end of the operating part.

4. The computer enclosure as described in claim 2, wherein a pivot shaft is extended perpendicularly from the first supporting wall, and a through hole is defined in the operating part corresponding to the pivot shaft.

5. The computer enclosure as described in claim 1, wherein a hole is defined in the front panel adjacent the entrance opening for extension of the pressing portion therethrough.

6. The computer enclosure as described in claim 1, wherein the base further comprises a bottom panel, and the supporting base is secured on the bottom panel.

7. The computer enclosure as described in claim 6, wherein the base further comprises a side panel, the positioning panel comprises a first positioning panel and a second positioning panel, and a positioning groove is defined along the first positioning panel.

8. The computer enclosure as described in claim 7, wherein the bottom plate of the drive bracket comprises a first bottom plate and a second bottom plate parallel with the first bottom plate, and the stopping portion is formed on the second bottom plate.

9. The computer enclosure as described in claim 8, wherein the drive bracket further comprises a connecting plate connecting the first bottom plate and the second bottom plate, and a positioning piece is formed on the connecting plate to receive the positioning groove.

10. A computer enclosure comprising:
a base comprising a side panel, a positioning wall and a front panel, an entrance opening defined in the front panel;
a drive bracket received in the base via the entrance opening, the drive bracket comprising a bottom plate, a first side plate and a second side plate, a bending piece bent from an end of the drive bracket, a stopping portion extending downwardly from the bottom plate; and
a locking member comprising a supporting base secured on the base and an operating part pivotally supported by the supporting base, a hook portion formed on a top of the operating part;
wherein the hook portion of the locking member retains the stopping portion of the A drive bracket, and the bending piece of the drive bracket abuts against outside of the base for preventing the drive bracket from moving forward and backward respectively.

11. The computer enclosure as described in claim 10, wherein the operating part is connected to the supporting base via a resilient portion.

12. The computer enclosure as described in claim 11, wherein the supporting base comprises a baseboard, and a first supporting wall and a second supporting wall bent upwardly from adjacent sides of the baseboard, the resilient part is secured on an inner surface of the second supporting wall.

13. The computer enclosure as described in claim 12, wherein a slot is defined in the baseboard between the first supporting wall and the second supporting wall for receiving a bottom end of the operating part.

14. The computer enclosure as described in claim 13, wherein a pivot shaft is extended perpendicularly from the first supporting wall, and a through hole is defined in the operating part corresponding to the pivot shaft.

15. The computer enclosure as described in claim 10, wherein the operating part further comprises a driving portion corresponding to the stopping portion and a pressing portion extending outside the front panel.

16. The computer enclosure as described in claim 10, wherein the bottom plate comprises a first bottom plate and a second bottom plate, the drive bracket further comprises a connecting plate connected between the first bottom plate and the second bottom plate, and the stopping portion is formed on the second bottom plate.

17. The computer enclosure as described in claim 16, wherein the positioning wall comprises a first positioning wall and a second positioning wall, a positioning groove is defined along a first positioning wall, and a positioning piece received in the positioning groove is formed on the connecting plate.

18. A computer enclosure comprising:
a base comprising a panel which defines an opening therein;
a drive bracket slidably received in the base via the opening, the drive bracket comprising a bottom plate, and a stopping portion extending downwardly from the bottom plate; and
a locking member comprising a supporting base arranged on the base, and an operating part pivotally connected to the supporting base, the operating part having a lower end forming a pressing portion extending out of the panel and an abutting portion preventing the lower end from moving forward, and an upper end forming a hook portion and a driving portion sandwiching the stopping portion of the drive bracket therebetween, a resilient member abutting against the lower end for preventing the lower end from moving rearward, thereby holding the drive bracket in the base;
wherein when the pressing portion is pressed, the hook portion leaves the stopping portion of the drive bracket, and the driving portion urges the stopping portion so that the drive bracket is moved out of the opening.

19. The computer enclosure as described in claim 18, wherein a slot is defined in the supporting base, the abutting portion of the lower end of the operating part abuts against a front end of the slot.

20. The computer enclosure as described in claim 18, wherein the resilient member is connected between a rear face of the lower end of the operating part and a rear wall of the supporting base.

* * * * *